(12) United States Patent
Robertsson et al.

(10) Patent No.: US 6,343,164 B1
(45) Date of Patent: Jan. 29, 2002

(54) OPTOELECTRIC MULTICHIP MODULE

(75) Inventors: Mats Robertsson, Stockholm; Olle Jonny Hagel; Göran Gustafsson, both of Linköping, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/263,521

(22) Filed: Mar. 5, 1999

(30) Foreign Application Priority Data

Mar. 6, 1998 (SE) .............................................. 9800757

(51) Int. Cl.⁷ ................................................. G02B 6/13
(52) U.S. Cl. .............................. 385/14; 385/49; 385/50; 385/131
(58) Field of Search ............................ 385/14, 15, 31, 385/39, 49–53, 129–132

(56) References Cited

U.S. PATENT DOCUMENTS

| | | | |
|---|---|---|---|
| 5,297,218 A | | 3/1994 | Hanaoka ...................... 385/52 |
| 5,388,174 A | | 2/1995 | Roll et al. ..................... 385/80 |
| 5,402,514 A | * | 3/1995 | Booth et al. ................. 385/130 |
| 5,659,648 A | | 8/1997 | Knapp et al. ................ 385/129 |
| 5,764,832 A | * | 6/1998 | Tabuchi ........................ 385/49 |
| 5,887,116 A | * | 3/1999 | Grote ..................... 385/131 X |
| 5,917,980 A | * | 6/1999 | Yoshimura et al. .......... 385/129 |
| 5,974,214 A | * | 10/1999 | Shacklette et al. ............. 385/50 |
| 6,031,945 A | * | 2/2000 | You et al. ...................... 385/14 |
| 6,078,704 A | * | 6/2000 | Bischel et al. ............. 385/14 X |

FOREIGN PATENT DOCUMENTS

| | | |
|---|---|---|
| EP | 466 134 | 1/1992 |
| WO | 86/02172 | 4/1986 |
| WO | 87/02518 | 4/1987 |
| WO | 93/15424 | 8/1993 |

OTHER PUBLICATIONS

Robertsson et al, "New Patternable Dielectric and Optical Materials For MCM–L/D–and o/e–MCM–packaging", Proceedings of the First IEEE International Symposium on Polymeric Electronics Packaging, pp. 203–212, Oct. 26–30, 1997.*

* cited by examiner

Primary Examiner—John D. Lee
(74) Attorney, Agent, or Firm—Burns, Doane, Swecker & Mathis, L.L.P.

(57) ABSTRACT

A thin-film multilayer structure on top of a substrate has three polymer layers having adapted refractive indices in which optical waveguides are formed. Signal conducting metal layers are located at these three thin-film layers. The metal is etched away at the waveguide cores so that ordinary optical waveguides of channel-type are obtained having a refractive index difference between the core and the cladding material. Holes are etched in the polymer layers in order to form electrical vias. Mirrors can be formed by laser ablating to provide connection of an optical waveguide to some component and to provide optical vias, in the case where another similar set of three polymer layers are applied on top of the layers shown. Hence, electrical and optical interconnections can be integrated in the multilayer structure using a minimum number of polymer layers and the optical waveguides can be constructed to have a low loss.

42 Claims, 7 Drawing Sheets

FIG. 1

OPTOELECTRIC MULTICHIP MODULE

The present invention relates to an optoelectric multichip module and a method of fabricating it using basically polymer materials.

BACKGROUND

Telecommunication systems using light propagating in different waveguides expand more and more today. There is a large interest in extending the optical networks even up to private homes and business offices, the so called local access network which is also called "Fibre To (In/From) the Home", "Fibre To (In/From) the Customer (Business)", etc. Also, there is a large interest in extending the use of optical networks in LANs, i.e. local area networks, used for interconnecting computers in a business estate and furthermore for communication inside computer equipment and for communication between computers and peripheral devices such as printers etc. In order to achieve this expansion, the costs of the components of the optical networks of course have to be reduced as much as possible. Very important costs are related to producing the optical transmitter and receiver modules including lasers, LEDs, etc. and other active or passive optical devices.

Figure 1:
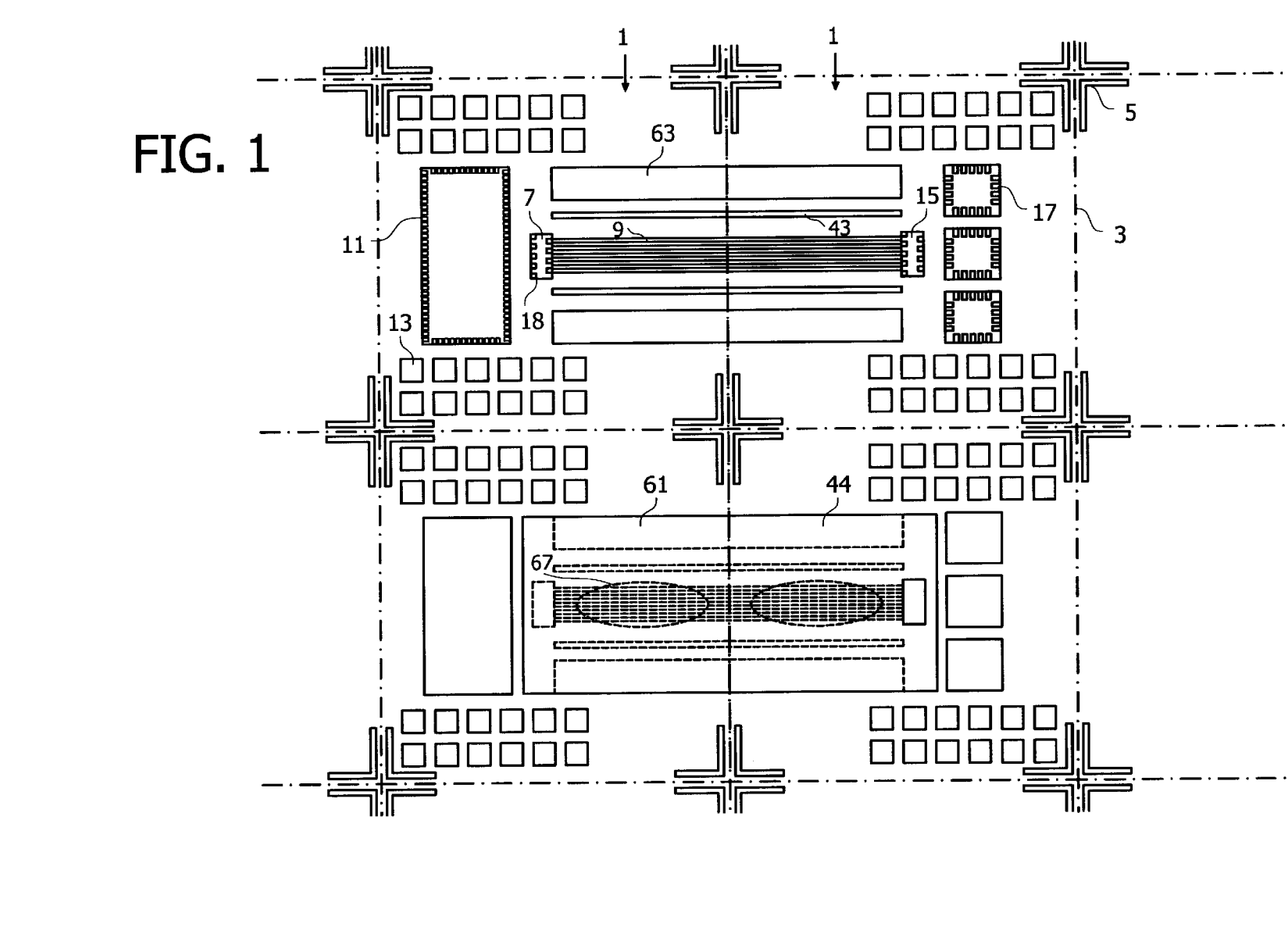
FIG. 1 is a plan view of a portion of a substrate covered by a multilayer structure forming electrical signal paths and optical waveguides, the portion in particular illustrating a transmitter module and a receiver module having connectors.
Figure 2:
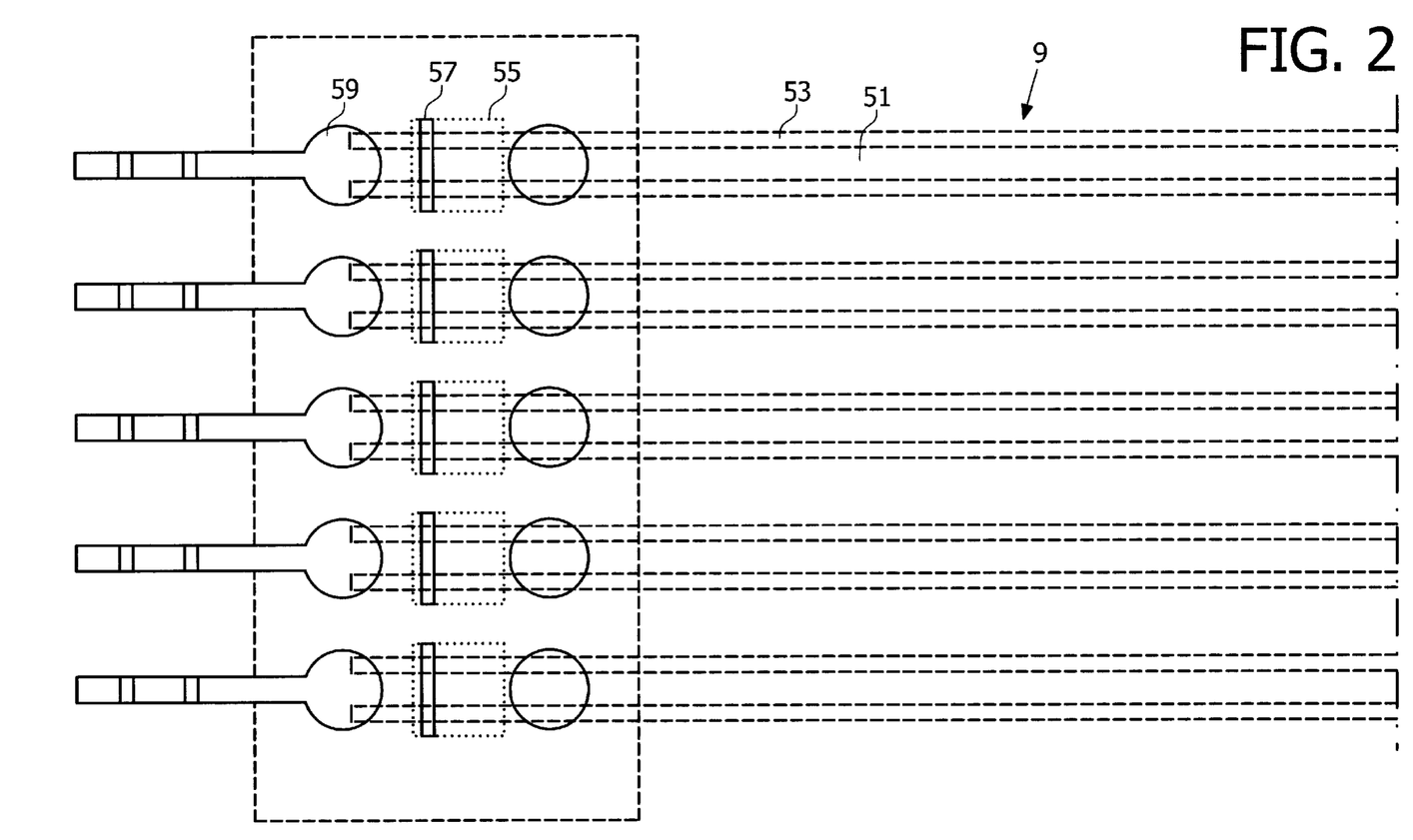
FIG. 2 is a plan view in a larger scale showing in particular optical waveguides and the mounting of a laser chip.
Figure 3:
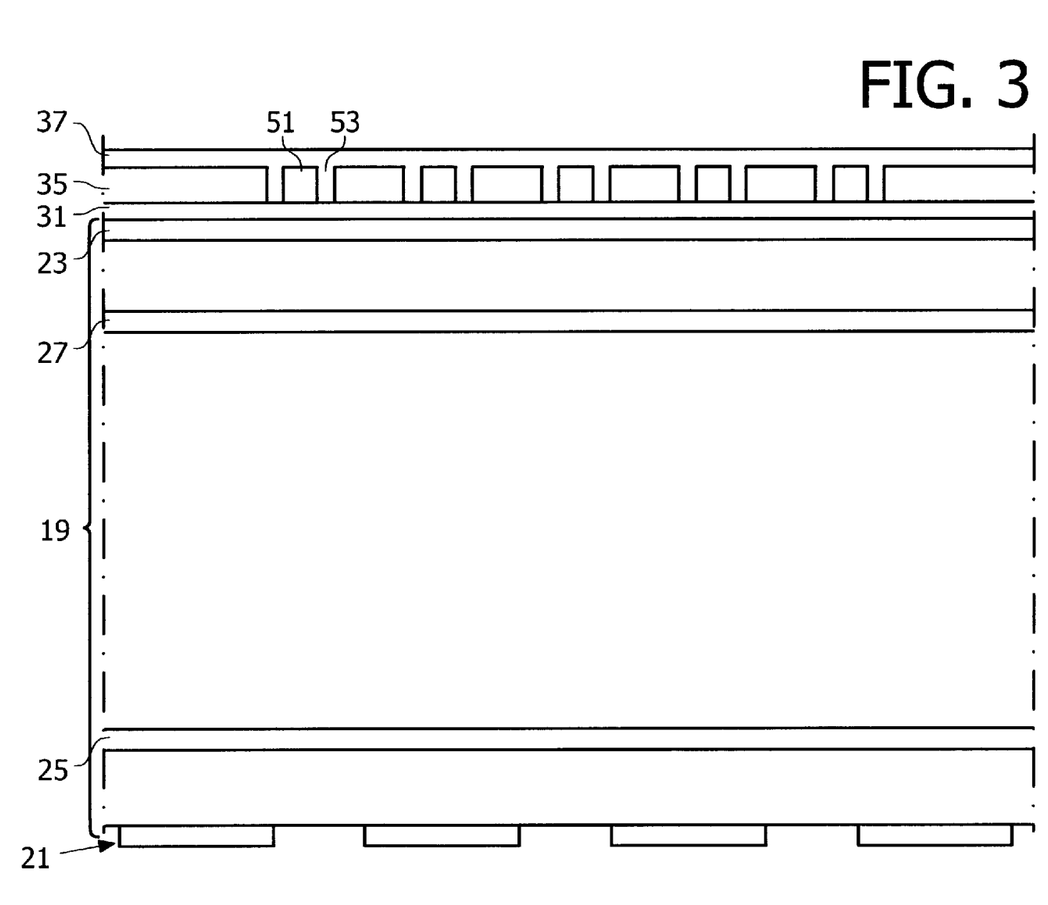
FIG. 3 is a cross-sectional view taken perpendicularly to optical waveguides showing the construction thereof.

Only in a few cases attempts have been made to drastically reduce the costs when commercially manufacturing optoelectric and electrooptical modules. For example, the company Motorola has put a concept called "OPTOBUS" on the market. Some details thereof are disclosed in U.S. Pat. No. 5,659,648 for Knapp et al. In a multilayer structure based on a substrate made of polyimide optical signal layers are used as electrically isolating layers between electrically conducting metal layers. In FIGS. 1 and 2 the structures comprise waveguide cores 17, 18, . . . and 45, 46 of a polymer material which at their sides have metal strips in a central layer, the metal strips forming part of the waveguide cladding. Layers under and on top of the central layer are made of polyimide and constitute an overcladding and an undercladding. In the structure shown in FIG. 3 whole metal layers 52, 60 are in addition placed between the central layer and the polymer cladding layers. No details are given in regard to positioning electrical signal conductors.

SUMMARY

It is an object of the invention to provide multilayer structures allowing both electrical and optical connections.

It is a further object of the invention to provide multilayer structures allowing electrical interconnections and optical connections having low losses.

It is a further object of the invention to provide a method of fabricating multilayer structures having electrical and optical connections which can be easily executed using a minimum number of processing steps.

A thin-film process is used for sequentially building a multilayer structure on top of a suitable substrate. In the multilayer structure at least on thin-film layer of a suitable polymer is used both as an electrically isolating layer separating signal conducting metal layers and as a layer of an optical waveguide. The materials of the thin-film structure are selected to be optically transparent to some suitable, selected light wavelength and have adapted refractive indices for this wavelength. Generally, signal conducting metal layers are located between and/or on top of and/or under the three thin-film layers forming the optical waveguide but the metal is etched away at the waveguide cores so that optical waveguides of the type having a refractive index difference between the core and the cladding material are obtained, i.e. the claddings are of a transparent optical material and are formed by portions of the bottom and top layers of the thin-film structure. Hence, electrical and optical interconnections can be integrated in the multilayer structure using a minimum number of polymer layers and the optical waveguides can be constructed having no metal layers for defining them or no metal layers in the direct vicinity of the waveguide cores. Various components can be mounted at the multilayer structure, such as lasers, photodiodes, electronic driver circuits for the optical devices, electronic logical and memory circuits. The components can e.g. be flip-chip mounted or wire bonded. For example a combined cable of ribbon type can be formed, accommodating both electrical conductors and optical waveguides.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

The fabrication of the multichip module to be described is generally based on the use of materials as described in M. Robertsson, A. Dabek, G. Gustafsson, O. J. Hagel, M. Popall, "New Patternable Dielectric and Optical Materials for MCM-L/D-and o/e-MCM-packaging", First IEEE Int. Symp. on Polymeric Electronics packaging, Oct. 26–30, 1997, Norrköping, Sweden. There, photo-patternable polymer materials, ORMOCER®, are disclosed which are suitable for optoelectrical multichip modules in order to build optical waveguides. In particular the refractive indices of these materials can be varied for producing cores and claddings of optical waveguide structures. In addition the materials can be processed at relatively low temperatures of 120–180°. Also, the materials have good etching characteristics. The low processing temperatures result in that low-cost substrates not suited for high temperature processing can also be used, so that substrates such as standard materials used for circuit boards, FR4-epoxy, BT-laminates, silicon wafers, ceramics, glass, metal, thin foils of polymers and other materials can be used.

In FIG. 1 a plan view of a portion of a substrate coated with various layers is shown, having optical and electric components mounted thereon. After manufacturing the substrate and having components mounted thereon the substrate is intended to be divide in square modules 1, the division lines being indicated at 3 and marks for cutting the substrate being shown at 5. At 7 a surface-emitting laser chip is shown, comprising five individual laser units. The laser units emit light into corresponding five optical waveguides 9 extending in parallel to each other and perpendicularly to a division line 3 and beyond this division line into a neighboring module 1. On the module on which the laser chip 7 is mounted an electronic driver circuit chip 11 is located and furthermore electric contact pads 13 are placed in the margin region of the considered module 1 for wired connection of chip capacitors, not shown. On the neighboring module, into which the optical waveguides 9 extend, a photodetector chip 15 is located receiving light from the five parallel optical waveguides 9. Three electronic driver chips 17 are also located on this module and also electric contact pads are provided. The optical and electronic chips 7, 15, 11, 17 can be electrically connected to the substrate by for example the ball grid array method, as is illustrated by the contact pads 18 drawn in dashed lines.

Figure 4:
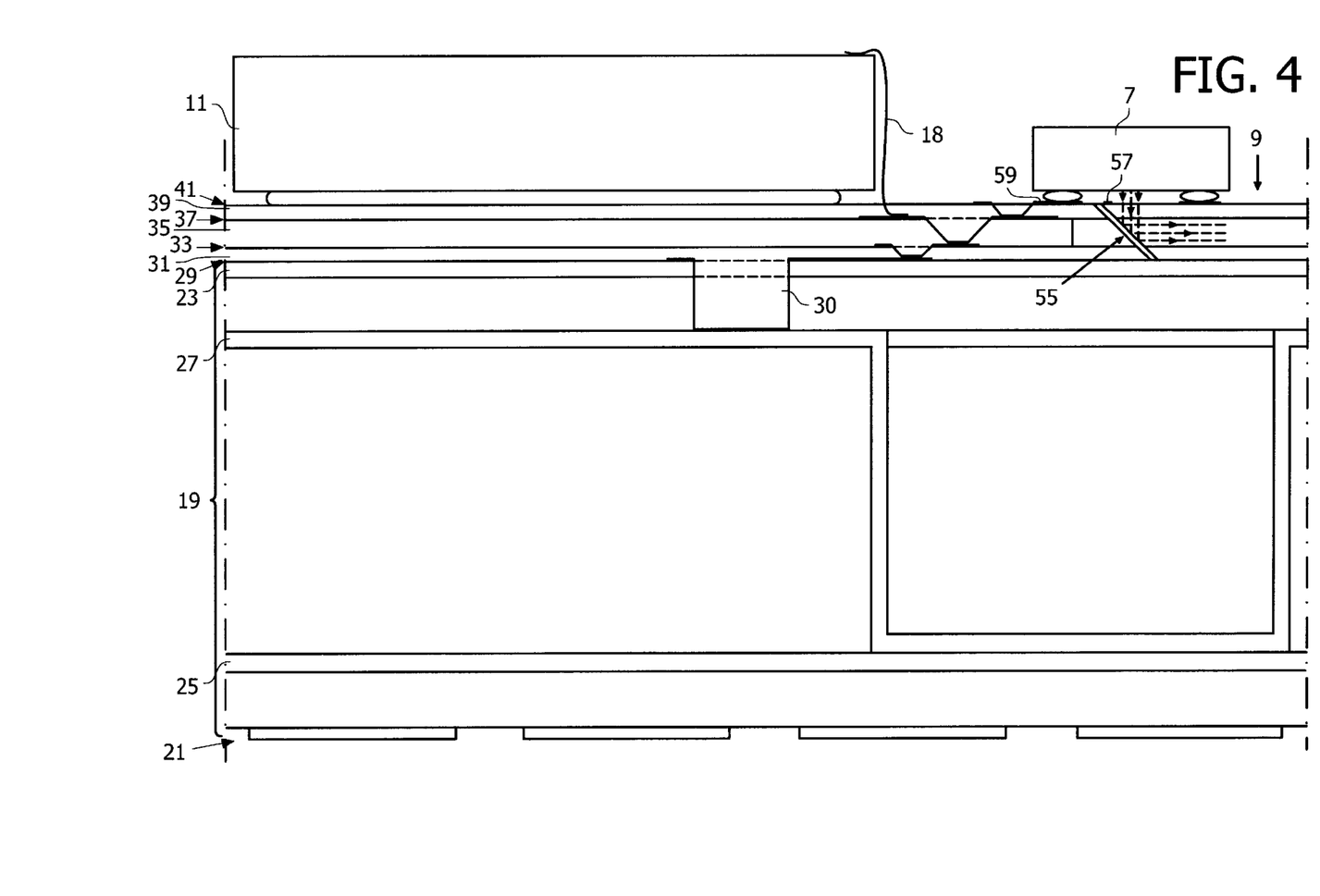
FIG. 4 is a cross-sectional view showing the mounting of a surface-emitting laser chip and its connection to electrical signal paths and to an optical waveguide.

In the partial elevational view of FIG. 4, the different layers which form the optical waveguides 9 and are located on top of the very substrate 19 are shown, and also electrically conducting layers and interconnections between layers at different levels. A substrate 19 of standard multilayer type is used having metal layers 21, 23 on its bottom and top surfaces respectively and two interior metal layers 25, 27. These metal layers can all be patterned to form suitable electrical conductors paths between various parts. Also, vias can be formed interconnecting the metal layers 21–27 of the substrate at suitable places in the conventional way. On top of the upper metal layer 23 of the substrate 19 is a first patterned thin metal layer 29 applied forming vias 30 for contacting the top interior thick metal layer 27 in the substrate 19. On top of the thin metal layer 29 a first polymer layer 31 is applied and on top of this layer in turn a sequence of a second thin, electrically conducting metal layer 33 for signal transmission, a second polymer layer 35, a third electrically conducting, thin metal layer 37 for signal transmission, a third polymer layer 39, a fourth electrically conducting, thin metal layer 41 for signal transmission is located. The driver circuit 11 is here as an alternative shown to be connected by wires 18 to contact areas of the third metal layer 37.

The polymer layers 31, 35, 39 are made of the polymer ORMOCER as described in the article cited above. The polymer layers 31, 35, 39 have adapted refraction indices in order to be capable of forming an undercladding, a waveguide core and an overcladding of optical waveguides as will be described hereinafter. Typical thicknesses are 5–20 µm, e.g. 10 µm, for the first or bottom and the third or top polymer layers 31, 39 and 5–70 µm, e.g. 20 µm, for the second or intermediate polymer layer 35. These polymer layers can all be patterned but they will only comprise a very small total area of holes or cutouts, primarily only via holes for allowing electrical interconnections between different levels. The second polymer layer 35 is in addition patterned to allow that cladding portions are formed at the sides of the waveguide cores formed in this layer, as will be described hereinafter. The top polymer layers 35, 39 can be patterned to comprise long parallel grooves 43 for allowing alignment of optical connectors 44 intended to be connected to one or two modules 1, see FIG. 1. Also, the top polymer layer 39 can have cut-outs to allow electrical contacting of the third electrical signal layer 37 from the top side of the structure with contact pads 13 provided in that metal layer.

The electrical signal layers 29, 33, 37, 41 are all very thin and can have a thickness of typically 3 µm to be compared to the thickness of the substrate metal layers 21, 23, 25, 27 which can be of the order of 200 µm. The three inner layers 29, 33, 37 in the top multilayer structure can be made of aluminum by sputtering. The top layer 41 is made of a sequence of layers comprising undermost a sputtered layer of aluminium, thereon a very thin titanium layer and a thin copper layer and on top a thicker nickel-layer coated with a thin gold layer. They are all patterned to form conductor paths and possibly electric contact pads and to fill via holes in the underlying polymer layer for contacting the electrically conducing layer located next thereunder. Rather little metal material may be left in each electrical signal layer and in particular there is no metal material at the bottom and top surfaces of the third polymer layer 39 at the areas in which it forms optical waveguide cores in order not to interfere with the propagation of light in the waveguides and allow a straight extension and a uniform cross-section of the waveguide cores.

In the enlarged view in FIG. 2 the top metal layer and the top polymer are shown and in particular the area under and at the laser chip 7. The waveguides 9 are here seen to comprise waveguide cores 51 formed of strips of the second polymer layer 35. At the sides of the cores 51 in this layer grooves 53 have been formed which then have been filled with material from the next polymer layer, the third or top polymer layer 39, see also the cross-sectional view of FIG. 3. The grooves 53 can have a width corresponding to the thickness of the overcladding and undercladding layers, i.e. having a width of e.g. 10 µm. The grooves 53 and thus the waveguides 9 extend under the laser chip 7, and there, in each waveguide, a mirror 55 is formed by a deep, oblique recess produced by laser ablating from the top of the layer assembly, see also FIG. 4. At least one edge of the mirror recesses 55 at the surface of the layer assembly is limited by strips 57 of metal of the top metal layer 41, the appropriate side of these metal strips 57 defining the position of the respective mirror recess 55. Contact pads 59 for electrically contacting the laser chip 7 and for aligning it by the use of surface tension forces when soldering the laser chip are also formed by the top metal layer 41. The contact and aligning pads 59 and the mirror defining strips 57 are thus formed by the same metal layer and using the same mask step for patterning this metal layer.

Figure 5:
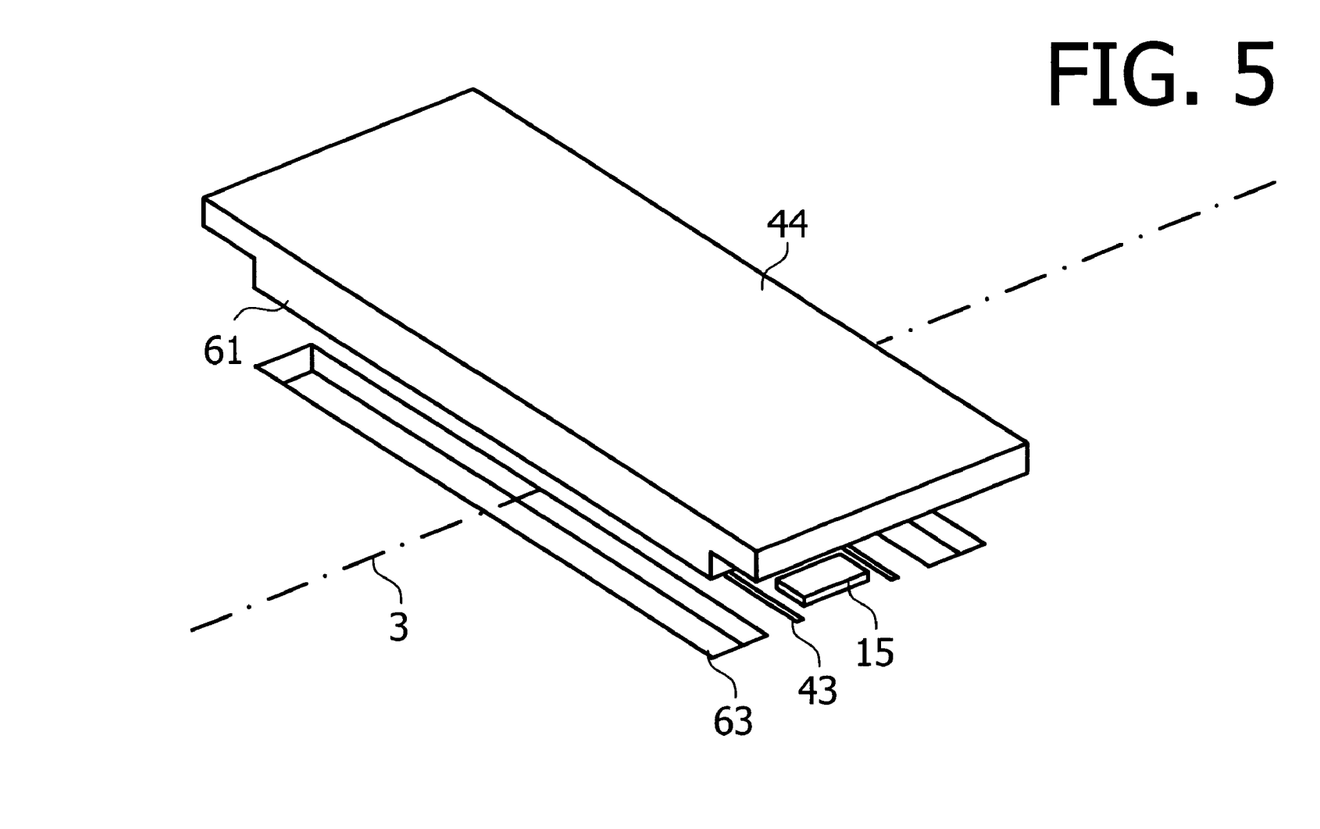
FIG. 5 is a perspective view illustrating the mounting of a connector device on substrate.

In the lower portion of FIG. 1, and in particular in FIG. 5, a connector structure 44 is visible. It is intended to form connectors of a kind as described in Swedish Patent Application No. 9504549-8. The connector structure 44 has the shape of an elongated rectangular plate from which, at the long sides thereof, ribs 61 project downwards. The ribs are symmetrically located at the long sides and end at some distance from the short sides of the rectangular connector body. The ribs 61 are intended to approximately position the connector structure by placing them in cut-out grooves 63 passing all through he polymer layers and the substrate 19. The grooves are machined, for example, after applying all the metal and polymer layers, but before mounting components. For a fine positioning or alignment, the connector structure 44 also has low alignment ribs, not visible, placed on the underside of the connector structure plate portion between the high ribs 61. The low alignment ribs cooperate with the grooves 43 in the top polymer layers in the structure as described above.

The connector structure 44 bridges two neighbouring modules 1. It is located above waveguides 9 extending between the modules and is intended to form aligning connectors for the waveguides. The connector structure 44 is mounted at the same time as other components are mounted on the coated substrate 19 and may e.g. be attached to the surface of the substrate by glue pads 67, see FIG. 1. In the embodiment illustrated in FIGS. 1 and 5 end portions of the plate-shaped body of the connector structure extend over the laser chip 7 and the photodetector chip 15 to form a protection thereof. After mounting all components and connector structures the substrate 19 is split into individual modules 1, by e.g. sawing, along the lines 3 as defined by the marks 5. After such a sawing operation the waveguides 9 are also cut off to have ends at the module borders. The ends of the waveguides will then be located in the same perpendicular or vertical plane as the cut-off ends of the connector structure 44, which by the splitting operation is divided into two connectors, one on each module 1.

Attaching the connector structures 44 before splitting the substrate into modules can lower the manufacturing costs, both by attaching basically two connectors in one operation and by having the end surfaces of the individual connectors located in the same cut-off plane as the end surfaces of the waveguides, which facilitates polishing the end surfaces which is necessary in order to form well-aligned waveguide connections having a low attenuation.

Figure 6:
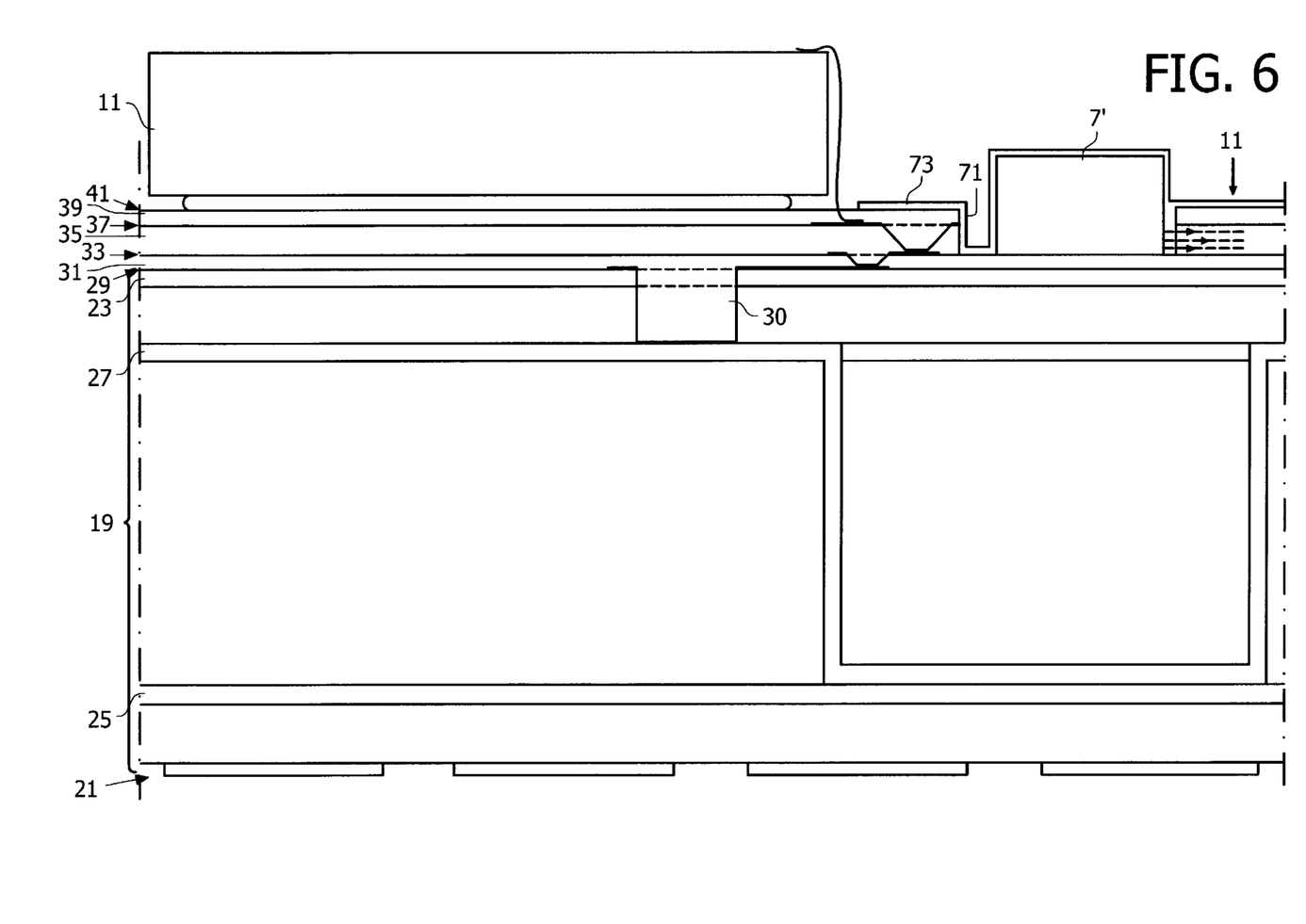
FIG. 6 is a cross-sectional view showing the mounting of a surface-emitting laser chip and its connection to electrical signal paths and to an optical waveguide.

In the surface structure allowing waveguides to be formed of course also edge emitting lasers can be used. This is illustrated in the sectional view of FIG. 6. Here an edge-emitting laser unit 7' is mounted in a recess 71 made in the two top polymer layers 35 and 39. The laser unit comprises a plurality of individual lasers issuing light into respective waveguides 9. The laser unit 7' can be protected by an additional polymer layer 73. This layer 73 can also penetrate between the surface of the laser unit 7' and the opposite end surfaces of the waveguides 9. It is then advantageously given a suitable refractive index in order to match the refractive indices of the laser units and waveguides in order to lower the attenuation of light coupled from the laser units into the waveguides 9 and to reduce back reflection of light into the laser units.

Figure 7:
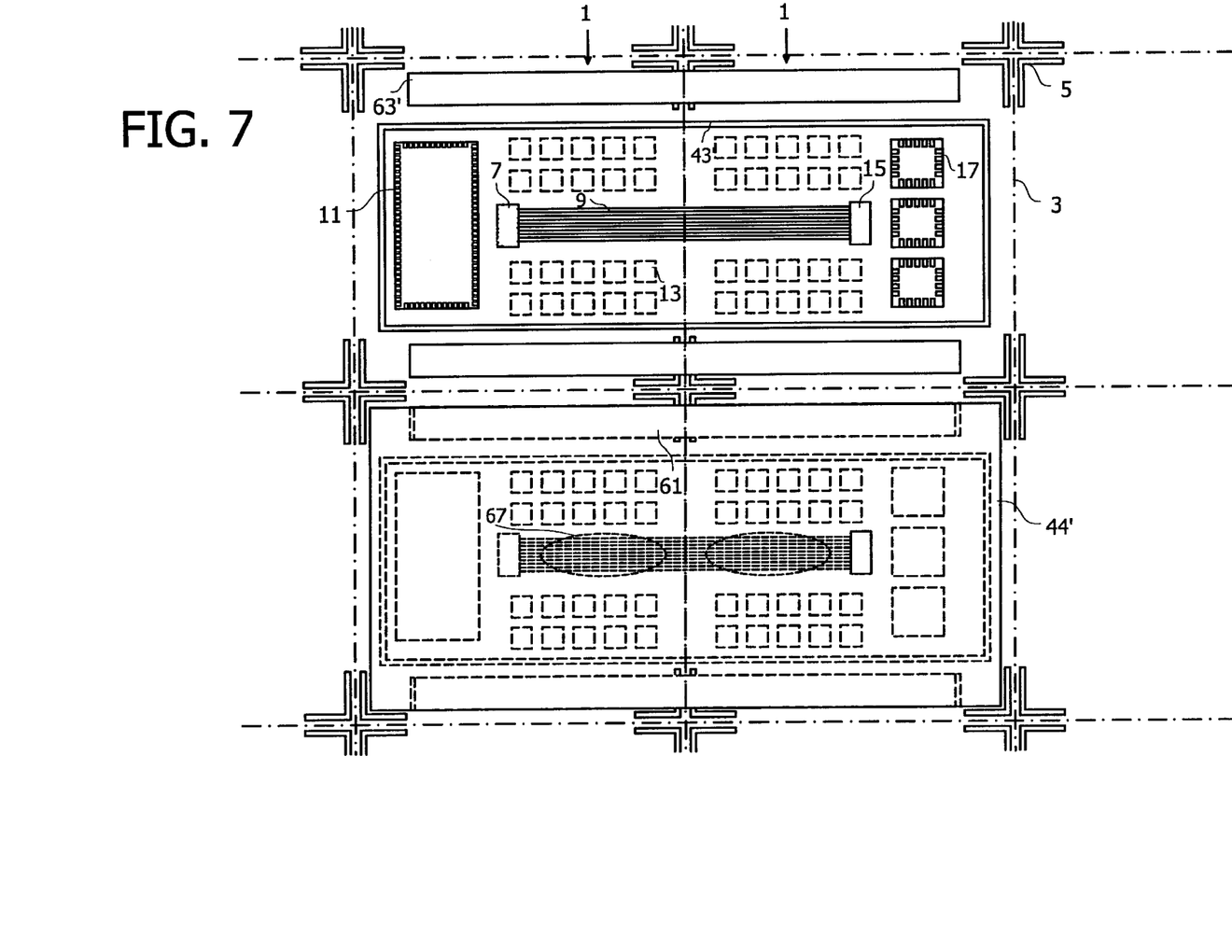
FIG. 7 is plan view similar to FIG. 1 illustrating an alternative embodiment of connectors for the transmitter and receiver modules.

An alternative embodiment of the connector structure is illustrated in FIG. 7. The connector structure 44' is there illustrated to cover the main portions of two adjacent multilayer modules and thus all the components of each module. The cut-out grooves 63' are located at two opposite edges of each module and the parallel low ribs 43' extend next to the grooves. The low ribs can be designed as a continuous rib parallel to three edges of each module for sealing each module at these three edges in addition to their main function of accurately positioning the connector structure 44' and thereby the individual connectors formed when splitting the substrate.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fail within a true spirit and scope of the invention.

We claim:

1. A multilayer structure for conducting electrical and optical signals, the multilayer structure comprising:
   a first polymer layer forming an undercladding of at least one optical waveguide,
   a second polymer layer placed on top of the first polymer layer and comprising at least one waveguide core of the at least one optical waveguide, and
   a third polymer layer placed on top of the second polymer layer and forming an overcladding of the at least one optical waveguide, and
   two metal layers located at opposite surfaces of one of the first, second and third polymer layers and forming electrical signal conductors thereby, at least one of the two metal layers being located at the second polymer layer, said one of the first, second and third polymer layers being electrically isolating, the two metal layers being patterned so that at the at least one waveguide core, in said at least one of the two metal layers, the metal of said at least one of the two metal layers is removed in at least one strip at and parallel to the at least one waveguide core, the at least one waveguide core only being directly bounded or directly surrounded by material in the first, second and third polymer layers.

2. The multilayer structure of claim 1, wherein the second polymer layer is patterned to form first recesses at sides of the at least one waveguide core, which first recesses are strip-shaped and in which first recesses material from the third polymer layer is located and forms side claddings.

3. The multilayer structure of claim 2, wherein the first recesses at sides of the at least one waveguide core have widths and the first and third polymer layer have thicknesses, which widths and thicknesses are substantially equal to each other.

4. The multilayer structure of claim 1 further comprising a substrate having electrical signal paths in the substrate, the first, second and third polymer layers being applied on a surface of the substrate, the multilayer structure further including a plurality of individual multilayer modules, in which the multilayer structure is intended to be divided, at least one of the at least one waveguide core extending between two neighboring multilayer modules to form an optical waveguide together with portions of the first and third polymer layers which form a cladding, which optical waveguide extends between the two a neighboring multilayer modules, so that the optical waveguide when dividing the multilayer structure in individual multilayer modules is divided in two portions, each portion of which is located on a separate multilayer module.

5. The multilayer structure of claim 4 further comprising a connector structure mounted at a free surface of the third polymer layer and at said optical waveguide which is intended to be divided in two portions, the connector structure being mounted to cover portions of the two neighboring multilayer modules, whereby, when dividing the multilayer structure in individual multilayer modules, the connector structure is divided in two portions, each portion of which being a connector for a respective portion of the optical waveguide which is also divided in two portions.

6. The multilayer structure of claim 5, wherein the connector structure is mounted to cover main portions of the two neighboring multilayer modules.

7. The multilayer structure of claim 1 further comprising
a second recess in the first, second and third polymer layers, the recess being located so that the at least one optical waveguide has an end surface located in a side wall surface of the second recess, and
an optical component mounted in the second recess for coupling optical signals to and/or from the optical component from and/or to the at least one optical waveguide respectively.

8. The multilayer structure of claim 1, wherein the first and third polymer layers are substantially whole layers extending all over the multilayer structure, the first and third polymer layers only having via holes for electrical and optical connections between different layers and to the exterior.

9. The multilayer structure of claim 1 further comprising
at least one optical and/or electrical component mounted to a surface of the multilayer structure, and
an additional polymer layer covering at least part of the surface of the multilayer structure and the at least one component.

10. The multilayer structure of claim 1 further comprising
at least one optical component mounted to a surface of the multilayer structure, and
an additional polymer layer covering at least part of the surface of the multilayer structure and the at least one optical component, the additional polymer layer having a refractive index selected to improve optical coupling between the at least one optical component and the at least one waveguide and penetrating into at least one space or slot between a surface of the at least one optical component, at which surface the at least one optical component is arranged to emit or to receive optical signals, and an end surface of the at least one optical waveguide.

11. The multilayer structure of claim 1 comprising at least two sequence of first, second and third polymer layers, one of the sequences being formed on top of another one of the sequences, and at least one optical waveguide located in each sequence.

12. A multilayer structure for conducting electrical and optical signals, the multilayer structure having a sequence of layers comprising:
a first patterned metal layer,
an electrically isolating first polymer layer forming an undercladding of at least one optical waveguide,
a second patterned metal layer,
an electrically isolating second polymer layer comprising a waveguide core and at the sides of the waveguide core narrow strips in which side claddings are formed and which have a refractive index lower than that of the waveguide core,
a third patterned metal layer, and
an electrically isolating third polymer layer forming an overcladding of the at least one optical waveguide.

13. The multilayer structure of claim 12, wherein the first and third polymer layers are substantially whole layers extending all over the multilayer structure, the first and third polymer layers only having via holes for electrical and optical connections between different layers and to the exterior.

14. The multilayer structure of claim 12 further comprising
at least one optical and/or electrical component mounted to a surface of the multilayer structure, and
an additional polymer layer covering at least part of the surface of the multilayer structure and the at least one component.

15. The multilayer structure of claim 12 further comprising
at least one optical component mounted to a surface of the multilayer structure, and
an additional polymer layer covering at least part of the surface of the multilayer structure and the at least one optical component, the additional polymer layer having a refractive index selected to improve optical coupling between the at least one optical component and the at least one waveguide and penetrating into at least one space or slot between a surface of the at least one optical component, at which surface the at least one optical component is arranged to emit or to receive optical signals, and an end surface of the at least one optical waveguide.

16. The multilayer structure of claim 12 comprising at least two sequences of first, second and third polymer layers, one of the sequences being formed on top of another one of the sequences, and at least one optical waveguide located in each sequence.

17. A multilayer structure for conducting optical signals, the multilayer structure having a sequence of layers comprising:
an electrically isolating first polymer layer forming an undercladding of at least one optical waveguide,
an electrically isolating second polymer layer comprising a waveguide core of the at least one optical waveguide and at the sides of the waveguide core narrow strips in which side claddings are formed and which have a refractive index lower than the refractive index of the waveguide core, and
an electrically isolating third polymer layer forming an overcladding of the at least one optical waveguide, the narrow strips having widths and the undercladding and overcladding layers having thicknesses, which widths and thicknesses are substantially equal to each other.

18. The multilayer structure of claim 17, wherein the first and third polymer layers are substantially whole layers extending all over the multilayer structure, the first and third polymer layers only having via holes for electrical and optical connections between different layers and to the exterior.

19. The multilayer structure of claim 17 further comprising
at least one optical and/or electrical component mounted to a surface of the multilayer structure, and
an additional polymer layer covering at least part of the surface of the multilayer structure and the at least one component.

20. The multilayer structure of claim 17 further comprising
at least one optical component mounted to a surface of multilayer structure, and
an additional polymer layer covering at least part of the surface of the multilayer structure and the at least one optical component, the additional polymer layer having a refractive index selected to improve optical coupling between the at least one optical component and the at least one waveguide and penetrating into at least one space or slot between a surface of the at least one optical component, at which surface the at least one optical component is arranged to emit or to receive optical signals, and an end surface of the at least one optical waveguide.

21. The multilayer structure of claim 17 comprising at least two sequences of first, second and third polymer layers, one of the sequences being formed on top of another one of the sequences, and at least one optical waveguide located in each sequence.

22. A multilayer structure for conducting electrical and optical signals, the multilayer structure comprising:
a first polymer layer forming an undercladding of at least one optical waveguide,
a second polymer layer located on top of the first polymer layer and comprising a waveguide core of the at least one optical waveguide, and
a third polymer layer located on top of the second polymer layer and forming an overcladding of the at least one optical waveguide, and
a substrate having electrical signal paths in the substrate, the first, second and third polymer layers located on a surface of the substrate, the multilayer structure further including a plurality of individual multilayer modules, in which the multilayer structure is intended to be divided, the waveguide core comprised in the second polymer layer extending between two neighboring multilayer modules to form an optical waveguide together with portions of the first and third polymer layers, said optical waveguide extending between the two neighboring multilayer modules, so that the optical waveguide when dividing the multilayer structure in individual multilayer modules is divided in two portions, each portion of which is located on a separate one of the individual multilayer modules.

23. The multilayer structure of claim 22 further comprising a connector structure mounted on a surface of the third polymer layer and at said optical waveguide which is intended to be divide in two portions, the connector structure covering a part of surfaces of the two neighboring multilayer modules, whereby, when dividing the multilayer structure in individual multilayer modules, the connector structure is divided in two portions, each portion of which is a connector for a respective portion of the optical waveguide which is also divided in two portions.

24. The multilayer structure of claim 23, wherein the connector structure is mounted to cover main portions of the surfaces of the two neighboring multilayer modules.

25. A multilayer structure for conducting electrical and optical signals, the multilayer structure comprising:
a first polymer layer forming an undercladding of at least one optical waveguide,
a second polymer layer placed on top of the first polymer layer and comprising at least one waveguide core of the at least one optical waveguide,
a third polymer layer placed on top of the second polymer layer and forming an overcladding of the at least one optical waveguide, said second and third polymer layers having material forming first strip-shaped recesses at sides of the at least one waveguide core, and
two metal layers located at opposite surfaces of one of the first, second and third polymer layers and forming electrical signal conductors thereby, at least one of the two metal layers being located at the second polymer layer, said one of the first, second and third polymer layers being electrically isolating, the two metal layers being patterned so that at the at least one waveguide core, in said at least one of the two metal layers, the metal of said at least one of the two metal layers is removed in at least one strip at and parallel to the at least one waveguide core, the at least one waveguide core only being directly bounded or directly surrounded by material in the first, second and third polymer layers.

26. A method of producing multilayer modules for conducting electrical and optical signals, the method comprising the steps of:
providing a substrate,
applying a first polymer layer to the substrate to form an undercladding of at least one optical waveguide,
applying on top of the first polymer layer a second polymer layer to form a waveguide core of the at least one optical waveguide,
applying on top of the second polymer layer a third polymer layer to form an overcladding of the at least one optical waveguide, said second and third polymer layers having material forming first strip-shaped recesses at sides of the at least one waveguide core, and
applying two metal layers, one of the two metal layers at a surface of one of the first, second and third polymer layers which is electrically isolating and another one of the two metal layers at an opposite surface of said one of the first, second and third polymer layer, and patterning the two metal layers to form electrical signal conductors, the patterning being made so that at the waveguide core, in one of the two metal layers which is located at the second polymer layer, the metal in the metal layer is removed in at least one strip at and parallel to the waveguide core, so that the waveguide core is only directly bounded or directly surrounded by material in the first, second and third polymer layers.

27. The method of claim 26 comprising the additional step of patterning, before applying the third polymer layer, the second polymer layer to form first recesses at sides of the waveguide core, which first recesses are strip-shaped, whereby, in the step of applying the third polymer layer, material from the third polymer layer penetrates into the first recesses to form side claddings of the optical waveguide formed by the waveguide core.

28. The method of claim 27, wherein in the step of patterning the second polymer layer the first recesses are given a width substantially equal to thicknesses of the first and third polymer layers.

29. The method of claim 26 comprising the additional step of dividing the substrate into a plurality of individual multilayer modules, the dividing being made to divide at least one optical waveguide in two portions, each portion of which is located on a separate one of the individual multilayer modules.

30. The method of claim 29 comprising the additional step of mounting, before the step of dividing the substrate, at least one component on at least one of the first, second and third polymer layers and the surface of the substrate.

31. The method of claim 29 comprising the additional step of mounting, before the step of dividing the substrate, a connector structure on the surface of the substrate and at said at least one optical waveguide, which in the step of dividing the substrate is divided in two portions, the mounting of the connector structure being made in such a way that the connector structure in the step of dividing the substrate is divided in two portions, each portion of which is a connector for a respective portion of said at least one optical waveguide which is also divided in the step of dividing the substrate.

32. The method of claim 26 comprising the additional steps of:
making a second recess in the first, second and third polymer layers and locating the second recess so that the at least one optical waveguide has an end surface located in a side wall surface of the recess, and mounting an optical component in the second recess for coupling optical signals to and/or from the optical component from and/or to the at least one optical waveguide respectively.

33. The method of claim 26, wherein in the steps of applying the first and third polymer layers the first and third polymer layers are applied as substantially whole layers extending all over the multilayer structure and only having via holes for electrical and optical connections between different layers and to the exterior.

34. The method of claim 26 comprising the additional steps of:
mounting at least one optical and/or electrical component to a surface of the multilayer structure, and
applying an additional polymer layer to cover at least part of the surface of the multilayer structure and of the at least one component.

35. The method of claim 34, comprising the additional steps of:
mounting at least one optical component to a surface of the multilayer structure, and
applying an additional polymer layer to cover at least part of the surface of the multilayer structure and of the at least one component, the additional polymer layer having a refractive index selected to improve optical coupling between the at least one optical component and the at least one optical waveguide, the additional polymer layer being made to penetrate into at least one space or slot between a surface of the at least one optical component, at which surface the at least one optical component is arranged to emit or to receive optical signals, and an end surface of the at least one optical waveguide.

36. The method of claim 26 comprising the additional steps of applying, after applying the first, second and third polymer layers, on top of the structure formed at least one similar sequence of first, second and third polymer layers, so that at least one optical waveguide is formed in each sequence.

37. A method of producing multilayer modules conducting electrical and optical signals, the method comprising the sequential steps of:
providing a substrate,
applying a first patterned metal layer to a surface of the substrate,
applying on top thereof an electrically isolating first polymer layer to form an undercladding of at least one optical waveguide,
applying on top thereof a second patterned metal layer,
applying on top thereof an electrically isolating second polymer layer comprising a waveguide core of the at least one optical waveguide, and at sides of the waveguide core, first recesses which are strip-shaped,
applying on top thereof a third patterned metal layer, and
applying on top thereof an electrically isolating third polymer layer to form an overcladding of the at least one optical waveguide, material from the third polymer layer penetrating into the first recesses to form side claddings of the at least one optical waveguide.

38. A method of producing multilayer modules conducting electrical and optical signals, the method comprising the steps of:
providing a substrate,
applying on top thereof an electrically isolating first polymer layer to form an undercladding of at least one optical waveguide,
applying on top thereof an electrically isolating second polymer layer comprising a waveguide core of the at least one optical waveguide and at sides of the waveguide core, narrow first recesses, which are stripshaped, and
applying on top thereof an electrically isolating third polymer layer to form an overcladding of the at least one optical waveguide, material from the third polymer layer penetrating into the first recesses to form side claddings of the at least one optical waveguide,
wherein the first strips have widths substantially equal to thicknesses of the first and third polymer layers.

39. A method of producing multilayer modules for conducting electrical and optical signals, the method comprising the steps of:
providing a substrate having electric signal paths in the substrate,
applying one or more layers to a surface of the substrate for forming one or more optical waveguides for conducting optical signals, and
splitting the substrate into a plurality of individual multilayer modules, the splitting being made to divide at least one of the optical waveguides into two portions which are located on separate ones of the individual multilayer modules.

40. The method of claim 39 comprising the additional step of mounting, before splitting the substrate, components on at least one of the layers and the surface of the substrate.

41. The method of claim 39 comprising the additional step of mounting, before splitting the substrate, a connector structure on the surface of the substrate, the connector structure being mounted to be located at said at least one of the optical waveguides, which is divided into two portions, in such a way that the connector structure in the step of splitting the substrate is divided into two portions, each portion of which being a connector of the portion of said at least one of the optical waveguides which is divided in the step of splitting the substrate.

42. A method of producing multilayer structures for conducting electrical and optical signals, comprising the steps of:
providing a substrate having electric signal paths therein,
applying layers on a surface of the substrate to form optical waveguides for conducting optical signals,
etching thereupon a recess into the layers at a location so that at least one of the optical waveguides has an end surface in a side wall surface of the recess, and
mounting an optical component in the recess for coupling optical signals to and/or from the component from and/or into said at least one of the optical waveguides respectively.

* * * * *